United States Patent Office 3,354,707
Patented Nov. 28, 1967

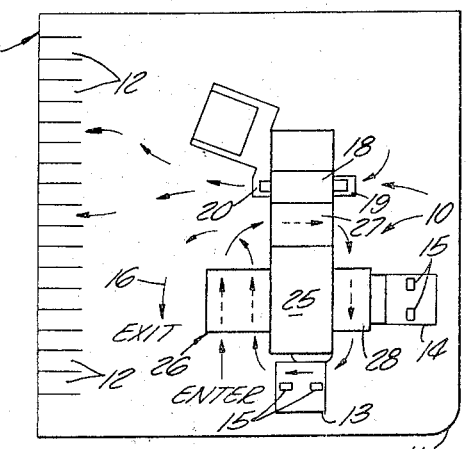

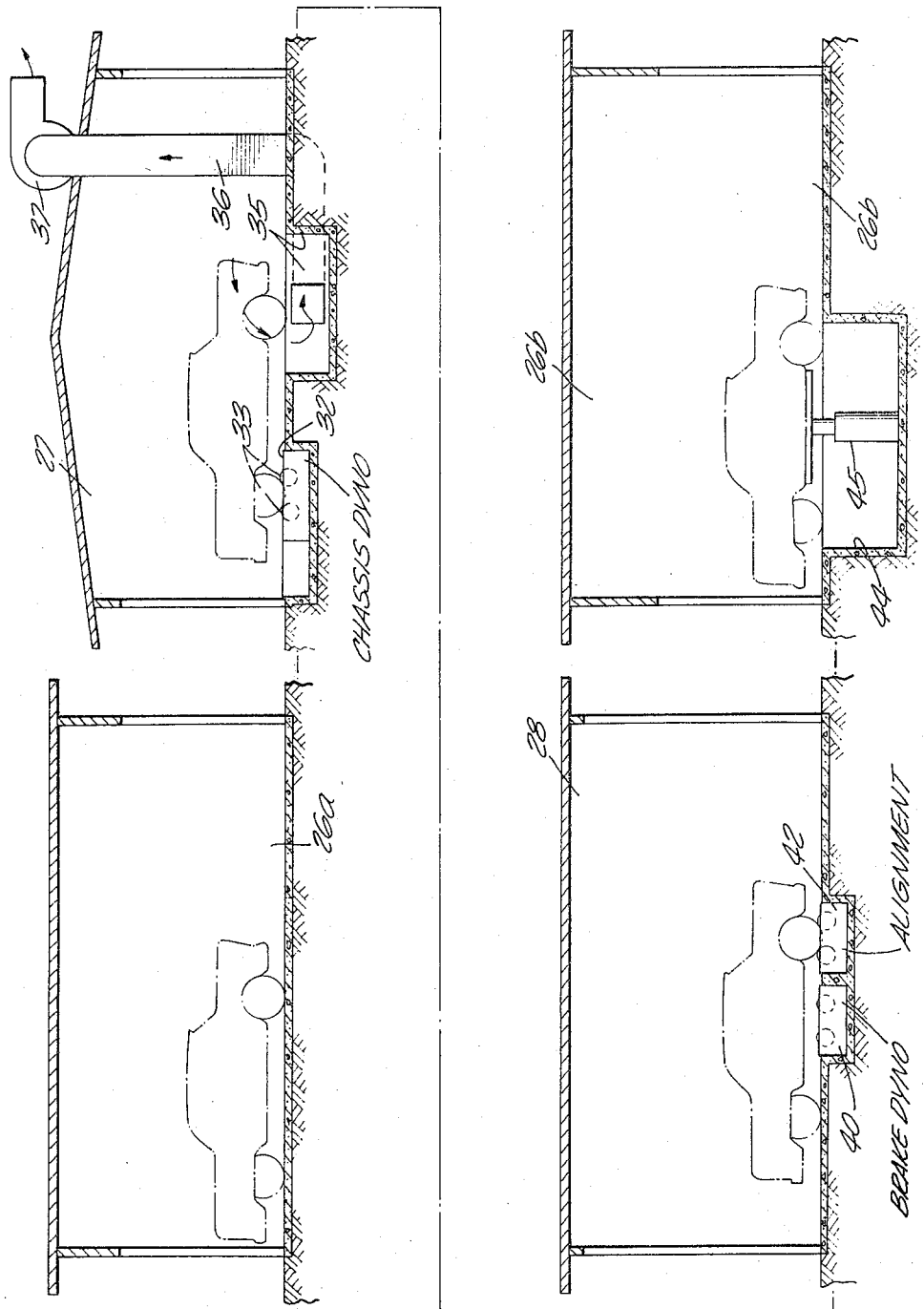

3,354,707
VEHICLE DIAGNOSTIC AND SERVICING
FACILITY
Raymond W. Born, West Covina, Calif. (5464 Highway
99 at Jefferson, Fresno, Calif. 93725)
Filed July 11, 1966, Ser. No. 564,054
10 Claims. (Cl. 73—117)

This invention relates to vehicle testing and servicing equipment and more particularly to an integrated vehicle diagnostic complex and servicing facility of unusual flexibility and versatility and having the most complete and efficient equipment for diagnosing all components of a motor vehicle under dynamic conditions wherever appropriate.

In recent years there has been made available to the motoring public a great variety of sophisticated testing and diagnostic equipment. For the most part, this equipment is capable of making only specialized tests such as wheel balance, ignition timing, and the like, and is widely scattered among different technicians specializing in the use of one or two items of such test equipment and there is at no one point a complete array of all types of diagnostic equipment with the result that a motorist must go from place to place. Since this is not feasible, it is commonplace for the motorist to rely upon the best judgment of a chosen mechanic. Even the most skilled of mechanics, however, are unable, except in extreme cases, to determine the need for making adjustments or the direction of degree of adjustment, or when a proper adjustment has been accomplished, without the aid of specialized equipment. All too often the mechanic plays safe by recommending replacement of components with new or rebuilt ones since the cost is little more and he avoids risking loss of a customer because an attempted adjustment merely augments rather than corrects the malfunction complained of.

In an attempt to avoid the foregoing and other difficulties widely experienced by motorists, it has been proposed to provide a facility equipped to specialize in vehicle diagnostic operations. These attempts involve bringing together a variety of modern test equipment manned by skilled test technicians. However, such attempts have not met with marked success because of the inefficient and ineffective arrangement of the test equipment and in such manner that a vehicle can be thoroughly tested quickly and at a reasonable cost commensurate with the value of the services rendered. Some of these prior proposals make use of the assembly line technique employing means for advancing vehicles from one test station to another and under such conditions that no upstream vehicle can be processed until the downstream vehicle has advanced to the next test area. Additionally, there has been no provision, or inadequate provision, for the customer witnessing or participating in the test operations. Additionally, the testing facility has included provision for making repairs thereby delaying and interrupting the testing procedure and introducing a loss of confidence factor in the customer's mind, based on the suspicion that only slightly worn parts were being replaced prematurely or needlessly.

To avoid the foregoing and other serious shortcomings of prior proposals respecting facilities for checking and diagnosing motor vehicles, there is provided by the present invention a highly specialized, efficient and versatile vehicle diagnostic and service facility specializing in diagnosing the operating condition of vehicles of all kinds under actual dynamic conditions and at any selected loading and speed condition. The facility includes the most modern testing and diagnostic equipment allocated to different test stations each arranged for observation by a staff supervisor located with the vehicle owner in a monitoring room. This room is located centrally of the test complex and is thoroughly soundproofed yet in full and complete view of the testing stations and the equipment therein.

Additionally, there is provided duplicate communication equipment between the test personnel and the control supervisor who accompanies the customer while going from one to another comfortable and convenient viewing positions in the monitoring room and opposite the testing operations then in progress. A particular feature of the facility is the arrangement of the testing stations in such manner that a vehicle can enter and leave any test station at any time without interfering with other busy stations, yet the test supervisor and the customer need move but a short distance to follow testing operations at the several stations. According to one preferred arrangement of the diagnostic facility, the test stations are so positioned that the vehicle under test enters alternate stations thereby permitting the stations to be located closer together and avoiding the need for the vehicle to make sharp turns or resort to special maneuvering as is otherwise necessary when attempting to enter the adjacent station. In all arrangements of the stations according to this invention, adequate provision is made for withdrawing or adding a car at any station without disruption of testing operations at any other station. Difficulties encountered by one vehicle do not interfere with operations at other test operations and vehicles can be entered for tests at one or more stations without need for advancing through the other stations should this be desirable for any reason.

Another feature is the location of the principal testing and servicing stations on a relatively small compactly-arranged plot of expensive ground with utilization of the entire plot to maximum capacity and efficiency while permitting areas close to the entrance and exit points to be used additionally to service vehicles and as unobstructed passageways for vehicles using the facility.

Additionally, the testing and service facilities include high-speed car laundry equipment in the adjacent one of the test stations arranged for entry and exit without interfering with the movement of vehicles to and between test stations.

Accordingly, it is a primary object of the present invention to provide an improved high-efficiency and complete vehicle diagnostic facility for checking motor vehicles under both static and dynamic conditions, as appropriate.

Another object of the invention is the provision of a vehicle diagnostic and service facility having the test equipment so segregated and arranged in independent testing stations as to be monitored by a chief technician and a customer in comfort.

Another object of the invention is the provision of a motor testing facility having independent testing stations each with its own exit and entrance passageways arranged for expeditious passage of a vehicle from one to the other and alternatively permitting a vehicle to use any selected station without interferring with operations in any other station.

Another object of the invention is the provision of a vehicle testing and servicing facility so arranged on a plot of ground as to permit portions thereof to be utilized in fueling vehicles and including a plurality of test stations separated from one another but arranged in a circuit of segregated cells and including provision for limited parking of vehicles while awaiting testing and pick-up by the owners after testing.

Another object of the invention is the provision of a vehicle testing facility having segregated test stations arranged in an overlapping split ring embodying a pair of companion stations in open side-by-side relation and wherein testing harness removed from a vehicle at the end of the testing cycle can be transferred directly to another vehicle entering the cycle in the other of these companion stations.

Another object of the invention is the provision of a compactly and efficiently arranged vehicle diagnostic facility having a plurality of independent test stations so arranged in spaced-apart end-to-end relation and to a common entrance and exit driveway opening outwardly from between said stations and extending about the exterior thereof that a vehicle leaving any station passes along the exterior of at least the next adjacent station before entering any other station.

These and other more specific objects will appear upon reading the following sepcification and claims and upon considering in connection therewith the attached drawing to which they relate.

Referring now to the drawing in which preferred embodiments of the invention are illustrated.

FIGURE 1 is a diagrammatic plan view of a plot of ground showing the invention diagnostic and servicing facility located thereon;

FIGURE 2 is a fragmentary cross-sectional plan view through the test facility;

FIGURE 3 is a developed sectional view through the test stations taken along the dotted line 3—3 on FIGURE 2; and FIGURE 4 is a fragmentary sectional view through a second preferred embodiment of the invention.

Referring more particularly initially to FIGURE 1, there is shown a vehicle servicing diagnostic facility designated generally 10 located adjacent one corner of a generally square plot of ground 11, here shown as bordering on two intersecting streets merging opposite corner 11a. Arranged along one interior edge of plot 11 is a series of car stalls 12 and sufficiently removed from facility 10 as to permit entrance and exit of cars from the stalls without interfering with operation of the test facility. Facility 10 includes at least one and preferably two sets of car servicing stations 13, 14 each located parallel with one of the intersecting streets and each equipped with one or more fuel pumps 15, 15 and the usual accompanying facilities for servicing tires, the radiator, battery, and the like. Vehicles can pass along either side of the fueling pumps in the usual manner, the passage past one set of pumps preferably overlapping with the normal flow circuit 16 for vehicles undergoing diagnosis for mechanical and electrical troubles.

The servicing facility also includes as an integral part thereof a high-speed car laundering facility 18 sufficiently large to house a single vehicle while being laundered and having an entrance at 19 and an exit at 20 and preferably equipped with a conveyor for advancing a car into and through the laundry.

Referring now more particularly to FIGURES 2 and 3, it will be understood that the facility includes a central monitoring and salesroom 25, a pair of companion test stations 26, 26a in side-by-side relation, and independent test stations 27 and 28 all located along separate side walls of monitoring room 25. The companion stations include an entry and initial test station 26a and a final test station 26b immediately alongside thereof and opening directly into one another along their adjacent sides. In FIGURE 3 these two test stations are shown in end-to-end relation for convenience in describing the normal test cycle. In other words, a car normally enters station 26a and then proceeds in order through stations 27, 28 and finally into station 26b. However, the tests may start in any station and proceed to the next or any other station until all tests or the particular ones of interest have been made.

While the vehicle is present in 26a numerous cables, tubular fittings, switches and the like, not shown, but well known to those skilled in thoroughly testing and checking motor vehicles and conventionally termed "test harness" are temporarily connected to the vehicle. This harness includes electrical connections to the distributor and electrical system, and other connections to the intake and exhaust manifolds, the carburetor, fuel pump, and the like components, operating under suction, pressure or electrical values indicative of non-functioning or malfunctioning conditions. This harness is normally supported on dolly racks or other suitable movable racks, or on bench 29 located between the passageways through test stations 26a and 26b.

Accordingly, the functions performed by personnel in station 26a include installation of the test harness and visual inspection and checking of the vehicle generally, including tire pressure, windshield wipers, windshield washer, glass and mirror, all fluid and vacuum lines, all electrical cables and connections, air filter, and crankcase ventilation. Also most fluid levels and conditions are inspected here, including lubrication, transmission, battery, brake fluid, power steering, and the cooling system, air conditioning, radiator cap pressure, leaks, air flow, all hoses and clamps, water pump, cooling system thermostat, and belts. Other conditions checked at this station include the motor cranking voltage capacity, battery voltage and specific gravity and the condition of its connectors, the starter motor, the current drain, and the condition of the starter solenoid and mechanism generally. Also checked is the charging regulator and its cut-in and cut-out voltages, current drain and condition generally.

Leaving the harness in place on the vehicle, the car is then advanced clockwise into station 27 for a thorough check of other parts of the electrical system, the ignition system, distributor, carburetion, fuel system, the engine condition and the speedometer accuracy. Other important tests performed in the second station are directed to the condition of the power drive train and a thorough horsepower analysis of the vehicle under dynamic conditions as actually transmitted to the roadway. All facets of the electrical system are checked and measured against the manufacturer's specifications. The carburetor is thoroughly checked including the operation of the automatic choke and the fuel-air ratio, its combustion efficiency under load conditions as imposed by the high-efficiency dynamometer 32 having its rollers 33 supporting the rear wheels of the vehicle.

A pit 35 directly beneath the vehicle engine is connected with a powerful suction ventilating system 36 and including a suction fan 37 isolated from the test station, as indicated in FIGURE 3, and discharging to the atmosphere. This feature is an important one and is effective to circulate large volumes of cool air through the radiator and over the engine to prevent any possibility of abnormal rise of the engine temperature during power-testing of the engine and power train system under both partial and full power conditions. Other checking performed at station 27 includes the pressure developed by the fuel pump, the vacuum pump and the total flow through these lines, the actual horsepower delivered to the road, any abnormal or unusual noise, the condition of the transmission system, the rear end operation, clutch operation and condition, drive line operation, acceleration rate, as well as the condition of the cylinders, valves, rings, and gaskets.

The vehicle then proceeds to the third station 28 where all light conditions throughout the vehicle are checked in minute detail. The front wheels of the vehicle are then driven onto a brake checking dynamometer 40 for checking the front brakes under driving conditions, following which the front wheels are advanced to the dynamic front end alignment checking equipment 42. It will be understood that the equipment at 40 and 42 is of a well known design capable of testing braking conditions and front end conditions while the front wheels are being driven at any desired typical roadway speed. These tests include brake balance, fading, deceleration rate, thorough bearing and rolling conditions, and all conditions respecting wheel camber, toeing and castering conditions including the actual variation from a normal and proper adjusted condition.

Finally before leaving station 28, the braking and wheel condition of each rear wheel is thoroughly checked in the same manner as the front wheels using braking dynamometer 40.

The vehicle then proceeds to final station 26b where the car is driven over a pit 44 occupied by technicians and provided with a hydraulic or other suitable hoist 45 for elevating the car to a convenient operating and inspection position by force applied directly to the frame leaving all wheels free for inspection and removal. A thorough inspection is made of all components on the underside of the vehicle with particular vigilance to the location and cause of any leak and the location of the source. The condition of the transmission, differential and all running seals is thoroughly checked by personnel in the pit while other personnel remove one or more wheels to inspect the condition of the bearings, brake shoes, brake drums, and the condition of the brake lining. Fluid lines are checked, as is the gas tank, and the heat valve associated with the exhaust system. The entire exhaust system is also thoroughly checked as is the tire and wheel conditions.

At this station all harness and test equipment is removed and transfered, where appropriate, to the next vehicle entering the test circuit via test station 26a.

All test stations are equipped with the necessary precision testing apparatus including read-out devices and scales sufficiently large for reading by the technicians at a distance and so positioned as to be visible and at least roughly readable by the chief inspector and the vehicle owner or customer while seated in the viewing window forming a part of the side walls of monitoring chamber 25.

In the foregoing connection it is pointed out that the side walls of chamber 25 are equipped with soundproofed walls and large soundproofed or sound-absorbing windows 46, 46 overlooking all operations being performed in the respective test stations. Associated with each of the viewing positions is a counter 47 having display panels with numerous instruments 48, 48 appropriately labeled and scaled for reading by the customer and the attending supervisor.

Complete electronic communication system is also provided at all test stations and at the monitoring positions in order that the technicians, the supervisor and the customer can communicate with one another across the soundproofed wall. This equipment includes microphones 49 and loudspeakers 50 appropriately positioned within both the test stations and the monitoring room as well as headsets for use by test personnel and the observers in the monitoring room. These include separate communication equipment between each of test stations 26a and 26b and the duplicate monitoring positions inside the associated window 46. By use of this equipment each supervisor and the customer can relay questions and information and listen in on all responses and comments made between the different technicians as they proceed with the test and inspection operations.

The operation of the facility described above will be quite apparent from the foregoing detailed description. The customer or other person having a car to be checked parks in one of the stalls 12 and then enters the monitoring room 25 through doorway 55 and places his order with the receptionist. His order is then given to a supervisor in charge of the tests to be performed on his vehicle. Normally, the supervisor and the customer proceed to the monitoring position in front of window 46 and don their respective headsets as the car is brought into the initial station 26a. The supervisor obtains general information about the car including the make, model and year of production, for relay to personnel and enabling them to apply the correct harness and follow the correct specifications in checking all details in following phases of the test. Also any current information about the condition of the car and suspicions of the customer respecting its condition are obtained and on the detailed report and relayed to test personnel.

After completing the tests referred to above and assigned to station No. 1, and as soon as station 27 is available for use, the car proceeds to that station as the supervisor and customer proceed to the next monitoring position. The same procedure is followed as the car advances to the third station 28 and finally to station 26b. As the tests proceed the supervisor makes detailed entries respecting every condition on a report form along with recommendations for repairs, adjustments, or replacement of any part. If any questions arise as testing proceeds, the customer relays them to the technician through his assigned supervisor and receives an answer from the skilled test personnel present with the vehicle.

If difficulties develop with any vehicle at any of the test stations or if greater than normal time is required to inspect a vehicle at any station, it is a simple matter to remove the vehicle from that station without interfering with the operation of any of the others and to re-enter the problem vehicle whenever there is an opportunity to do so without interfering with the normal operation of the remainder of the test stations.

At the conclusion of the tests, and while the harness is being removed from the completed vehicle in station 26b, the attendant proceeds with the customer to the pricing desk located at any convenient place, as in the partitioned space 56 of monitoring room 25. There the reasonable and fair price for all replacement parts found desirable by the tests is entered on the report form along with standardized prices prevailing in that area for installation by trained mechanics. The customer may then proceed to any garage or mechanic of his choice and hand them the report and authorize a portion or all of the recommended repairs. Usually he provides the person authorized to do the work a carbon copy of his diagnostic report from which the prices of the components and the labor charges are omitted. The owner is then enabled to determine whether he has been fairly charged after completion of the work but before making payment. Normally, no difficulties should be experienced since all mechanics in the test station area will be aware of the practice of that testing station and will deal fairly with the customer.

Laundry facility 18 occupies a relatively small space on plot 11 and is so positioned that cars can enter and leave it without interference with the diagnostic operations. Preferably, this facility is of the ultrasonic type using high-frequency high-pressure jets of water without detergent to perform a high efficiency cleaning operation in less than two minutes. However, it will be understood that any other type of car laundry equipment may be used.

Referring to a second preferred embodiment of the invention 10' shown in FIGURE 4, it is pointed out that the same reference characters designate the same or similar structure described above in connection with FIGURES 1 to 3 but are distinguished therefrom by the addition of a prime. This second embodiment will be understood as generally similar to that shown in FIGURES 1 to 3 but is substantially more compact and efficient in the usage of ground area without need for reducing the actual working space in any material degree. Observation room 25' for the supervisory staff and customers is reduced appreciably by the elimination of merchandise display and sales facilities. Also the soundproof walls and windows 46 overlooking the several testing stations are arranged at an obtuse angle to one another along the inner sides of the respective test stations.

As here shown, the exterior walls 54 of the test stations lie in a circle having a radius centered generally centrally of room 25' and are provided with wide openings 56, 57, 58 through which vehicles pass while entering and leaving the open ends of the several test stations.

Dashed line 60 represents one of the several possible paths taken by vehicles using the FIGURE 4 diagnostic facility. This line shows a vehicle entering test station 26b' through opening 56 and leaving outwardly through opening 57, and passing along the exterior of test station 26a', into test station 28' through opening 58, and across front entrance 55'. The vehicle then proceeds into test station 27', outwardly through opening 56, along the exterior of station 26b' and into station 26a'. The vehicle has now entered all testing stations and leaves the diagnostic facility through opening 58.

As will be appreciated from a consideration of FIGURE 4, the path of travel just described is merely one of many which may be taken without need for making either a sharp or a reverse turn. In fact the test stations may be visited in any order so long as the vehicle leaves through one of the openings 56, 57, 58 and passes along the exterior of at least the next adjacent test station before again entering a station.

The FIGURE 4 embodiment features all of the testing and diagnostic equipment and capabilities described in detail in connection with FIGURES 1 to 3 and, in general, is used in the same manner to provide the same results despite the fact that the test facility occupies only about one-half as much ground space. Additionally the vehicles pass from station to station much more expeditiously and with less hazard to themselves and to the facility.

While the particular vehicle diagnostic and servicing facility herein shown and disclosed in detail is fully capable of attaining the objects and providing the advantages hereinbefore stated, iti s to be understood that it is merely illustrative of the presently preferred embodiments of the invention and that no limitations are intended to the details of construction or design herein shown other than as defined in the appended claims.

I claim:

1. A vehicle testing facility for subjecting a motor vehicle to comprehensive mechanical and electrical diagnostic testing in sequence in a plurality of test stations forming part of said testing facility and each equipped with test apparatus adapted to make different diagnostic tests including tests under simulated highway operating conditions thereby to provide information on deficient conditions and performance characteristics of the vehicle, said testing facility comprising a unitary building complex having a floor, a central monitoring room for use by customers while having their respective vehicles progressively and simultaneously diagnosed, said monitoring room having a plurality of windows in the wall thereof, said building complex including means providing a separate test station immediately outside each of said windows sized to accommodate a vehicle and each equipped with diagnostic testing and inspection equipment for making tests on a vehicle different from the tests made in each of the other test stations and the sum total of which is required to perform the aforesaid comprehensive testing of the vehicle, said facility floor including driveway means leading into and out of each of said test stations and to and from the exterior of said building complex and selectively usable to advance a vehicle from one test station to another test station until all components of said comprehensive diagnostic testing having been completed and for admitting a vehicle to or releasing a vehicle from any testing station while the adjacent testing station is occupied wtihout interfering with testing operations in progress on a different vehicle in said adjacent station.

2. A vehicle testing facility as defined in claim 1 characterized in that the test equipment in one of said test stations includes dynamometer means having rollers positioned to be driven by the rear wheels of a vehicle supported thereon while undergoing a power test, and powerful suction means having an air inlet to draw air from beneath the vehicle motor to cool the same and for exhausting this air and engine fumes into the atmosphere outside said test station.

3. A vehicle testing facility as defined in claim 1 characterized in the provision of two-way electronic communicating means between said test stations and the interior sides of said windows continuously available to provide two-way communication between the customer and a consultant inside said monitoring room and test personnel in the test stations whereby questions posed by the customer can be immediately channeled to test personnel and answers relayed back.

4. A vehicle testing facility as defined in claim 1 characterized in that said testing and diagnostic equipment is so divided between said plurality of test stations that approximately the same period of time is required to complete the schedule of tests alloted to each test station whereby the vehicles can be advanced substantially simultaneously and in a manner keeping the personnel in each test station efficiently occupied.

5. A vehicle testing facility for subjecting a motor vehicle to comprehensive mechanical and electrical diagnostic testing in sequence in a plurality of test stations forming part of said testing facility and each equipped with test apparatus adapted to make different diagnostic tests including tests under simulated highway operating conditions thereby to provide information on deficient conditions and performance characteristics of the vehicle, said testing facility comprising a unitary building complex having paving thereabout opening to public thoroughfare means, a monitoring room having sound absorbing walls with windows therein, said building complex including means providing a plurality of spaced apart vehicle test stations each having a wall in common with said monitoring room and each having one of said windows therein providing persons within the monitoring room with a view of testing operations in the associated test station, said test stations having a vehicle exit and an entrance at their opposite ends, each of said test stations being equipped with vehicle inspection and diagnostic apparatus for making different tests useful in performing a different portion of said comprehensive vehicle testing, said diagnostic apparatus including scaled instruments showing the results of all tests and many of which instruments are located immediately inside the window overlooking the associated test station and substantially all of which are readable by the customer and by a test consultant observing the test, paved drive means interconnecting the exits and entrances of all of said test stations each having an exit port therefrom between the ends of adjacent test stations through which a vehicle can leave or enter whereby a vehicle can pass through all of said test stations in any sequence while undergoing a complete test and without interfering with test operations in progress in any occupied test station, and said monitoring room enabling the customer and a test consultant to shift quickly and conveniently from one observation window to another as a vehicle undergoing testing progresses from first one to another of said test stations until said comprehensive diagnostic test has been completed and while being isolated from the noise and engine fumes accompanying the testing of vehicles in said test stations.

6. A vehicle testing facility as defined in claim 5 characterized in that one of said testing stations is equipped with dynamometer means capable of absorbing substantially the full power output of a vehicle engine mounted thereon, and powerful suction means having an air intake effective to exhaust heated air from the engine thereby to simulate normal movement of cooling air over the engine as though operating over the highway, and means for exhausting this air along with engine fumes to the atmosphere.

7. A vehicle testing facility as defined in claim 5 characterized in that said paved drive means surrounds said testing facility along the exterior sides of said test stations whereby a vehicle can pass therealong enroute to the entrance of any test station and leave that station after being tested and proceed to the entrance of other test stations in random sequence.

8. A testing facility as defined in claim 5 characterized in that said test stations are arranged in a ring along the different walls of said monitoring room with adjacent test stations arranged at an angle to one another, and the paved drive from the exit of said test stations providing a travel path for a vehicle crossing the entrance travel path into the next adjacent test station whereby a car leaving one test station may be easily and quickly enter other of said test stations by first bypassing the next test station to the one being vacated.

9. A testing facility as defined in claim 5 characterized in that said test stations include rooms along the opposite sides and across at least one end of said monitoring room, and said monitoring room having a public entrance at the other end thereof.

10. A testing facility as defined in claim 5 characterized in the provision of two-way communication means between the customer observation positions on the interior of said windows and test personnel located in said test rooms and continuously available for use in either direction to relay questions and answers without delay and as the questions arise and providing means for relaying test results from the test rooms for recording by a test consultant located in said monitoring room.

References Cited

UNITED STATES PATENTS

| | | | |
|---|---|---|---|
| 2,049,025 | 7/1936 | Rosehrock | 137—234 |
| 3,238,771 | 3/1966 | Myrtetus et al. | 73—11 |

OTHER REFERENCES

Architectural Forum. February 1953, page 107, NA A5 52/174.

Motor Service. March 1962, pages 88–90 and 150. T 208 A1M6.

Motor Age. July 1963, pages 42, 43, 124, and 128. T M88.

Motor Age. December 1963, page 46, TL 1 M88.

RICHARD C. QUEISSER, *Primary Examiner.*

J. MYRACLE, *Assistant Examiner.*